(12) United States Patent
Mager et al.

(10) Patent No.: US 6,413,638 B1
(45) Date of Patent: Jul. 2, 2002

(54) COATED PARTICLES CONTAINING A MONOMERIC, POLYFUNCTIONAL ORGANOSILANE COATING

(75) Inventors: Michael Mager, Leverkusen; Johannes Eickmans, Haan; Rainer Bellinghausen, Bomlitz, all of (DE); Serge Tavernier, Lint; Raf Voets, Hever, both of (BE)

(73) Assignee: Agfa Gevaert AG (DE)

( * ) Notice: Subject to any disclaimer, the term of this patent is extended or adjusted under 35 U.S.C. 154(b) by 0 days.

(21) Appl. No.: 09/423,921

(22) PCT Filed: May 11, 1998

(86) PCT No.: PCT/EP98/02727

§ 371 (c)(1),
(2), (4) Date: Dec. 9, 1999

(87) PCT Pub. No.: WO98/53372

PCT Pub. Date: Nov. 26, 1998

(30) Foreign Application Priority Data

| May 23, 1997 | (DE) | 197 21 626 |
| Feb. 23, 1998 | (DE) | 198 07 634 |

(51) Int. Cl.$^7$ ................................................. B32B 5/16
(52) U.S. Cl. ....................... 428/403; 428/447; 428/702; 430/106.6
(58) Field of Search ................................ 428/403, 407, 428/405, 702, 447; 430/106.6

(56) References Cited

U.S. PATENT DOCUMENTS

| 3,726,907 A | * | 4/1973 | Tesoro et al. |
| 4,600,677 A | | 7/1986 | Hoffend et al. ............. 430/108 |
| 4,977,054 A | * | 12/1990 | Honjo et al. ................ 430/108 |
| 5,468,825 A | | 11/1995 | Takarada et al. .............. 528/15 |
| 5,532,096 A | | 7/1996 | Maruta et al. ............... 430/108 |
| 5,707,783 A | * | 1/1998 | Stauffer et al. ............. 430/313 |
| 5,709,975 A | * | 1/1998 | Yoerger et al. ............. 40/106.6 |
| 5,888,692 A | * | 3/1999 | Voets et al. ................ 430/137 |
| 6,159,540 A | * | 12/2000 | Menon et al. .............. 427/220 |

FOREIGN PATENT DOCUMENTS

| DE | 19603241 | 7/1997 |
| EP | 662 644 | 7/1995 |
| FR | 2219447 | 9/1974 |
| JP | 59223460 | 12/1984 |
| JP | 63085759 | 4/1988 |
| JP | 06350866 | 12/1994 |

* cited by examiner

*Primary Examiner*—Hoa T. Le
(74) *Attorney, Agent, or Firm*—Connolly Bove Lodge & Hutz LLP

(57) ABSTRACT

Finely divided particles can be provided in a simple manner and with good adhesion with a coating which is a polyfunctional organosilane and/or a hydrolysis product thereof, and/or a reaction product thereof with an organosilane which contains a hetero atom and/or with an alkoxide.

13 Claims, No Drawings

COATED PARTICLES CONTAINING A MONOMERIC, POLYFUNCTIONAL ORGANOSILANE COATING

This invention relates to coated particles, particularly particles with an inorganic content, preferably purely inorganic particles and most preferably coated magnetic particles, which are used as carrier particles in electrostatographic developers for the electrostatographic production of images.

There is a series of electrostatographic printing methods which are known, e.g. direct electrostatic printing, in which toner is deposited by means of an electronically addressable print head on to a receiver material which does not comprise a latent electrostatic image.

In another form of electrostatic printing, toner formers are produced on an image-producing element in the form of a rotating drum which contains an electrostatic layer which consists of a multiplicity of controllable electrodes in and under a dielectric layer. An electrical voltage is generated in the controllable electrodes, according to the image, and attracts toner particles from a toner source.

In addition, it is known that in electrographic printing and in electrophotographic copying a latent electrostatic image can be produced, either of an original to be copied or for digitised data which describe an image which is accessible electronically.

In electrophotography, a latent electrostatic image is produced by the steps of a) charging a photoconductive element congruently, and b) discharging according to the image by an exposure which is modulated image by image.

In electrographics, a latent electrostatic image is produced by the deposition of electrically charged particles corresponding to the image, e.g. on a dielectric substrate by an electron beam or by ionised gas.

The latent image formers obtained are developed, namely they are converted to visible images by depositing substances on them which selectively absorb light; these substances are called toners and usually carry a triboelectric charge.

Two techniques are used for the toner development of latent electrostatic images: dry powder and liquid dispersion development, with dry powder development being the more commonly used.

Dry powder development can be carried out in various ways. One method is the single component method, in which the toner itself is charged by friction, transported by a roller and deposited on the latent image. The quality is limited, particularly if coloured prints are to be produced. Another method utilises liquid development, in which colloidally charged toner particles are applied to the photoconductor in a liquid insulating medium, e.g. a hydrocarbon. One disadvantage of this method is the emission of volatilised organic substances, particularly when high printing speeds are employed. A third method utilises a two-component developer. In this case, large-grained carrier particles which can be attracted magnetically form a magnetic brush on the surface of the developer roll, by forming the magnetic hairs of the brush. Triboelectrically charged toner particles are present on the surface of the carrier particles. These are stripped from the carrier particles according to the electrical charge of the latent electrostatic image, whereby the toner image is produced. In this method, the carrier particles are reused repeatedly; their mechanical stability is therefore particularly important.

Non-magnetic electrophotographic developers comprising two components can also be used as an alternative to what is termed the magnetic brush. In one particular embodiment, the developer consists of small glass spheres, which are optionally coated, and of toner particles.

The developer is caused to deposit on the element carrying the latent image and in this manner causes development, as is described in BE 828 210. The carrier particles are also reused in this case.

In the case of surface-coated carrier particles, the stability of the surface coating is particularly important. Insufficient mechanical stability results in losses of quality of the printed image, and the developer has to be replaced, which causes unnecessary stoppages and cost.

A material with anti-adhesion properties is preferred for coating the carrier particles, in order to prevent the toner from sticking to the carrier surface. In most cases, however, this leads to a decrease in the adhesion of the coating on the carrier, which results in a shortening of the service life, e.g. when silicone resins are used as carrier coating media.

Carriers are known from U.S. Pat. No. 4,977,054 which consist of a magnetic powder and a silicone resin coating. The silicone resin used consists of D and T structural units (in D units the silicon atom is linked to further silicon atoms via 2 oxygen atoms, in T units it is linked via 3 oxygen atoms), wherein other functional organosilanes, such as di- and trialkoxy-functional organosilanes and/or di- and trialkoxy-functional organosilanes which contain nitrogen, can also be added in addition. Deposition is effected, as can be inferred from the examples, in a fluidised bed reactor; thereafter, the coatings are also cured at 190° C. to 296° C.

However, the aforementioned coatings comprising (polymeric) silicone resins have the disadvantage that high temperatures (190 to 296° C.) are necessary for complete curing. Furthermore, many silicone resin coatings in fact exhibit anti-adhesion properties, and inevitably exhibit poor bonding to the substrate. According to U.S. Pat. No. 4,4977,054, di- and trialkoxy-functional organosilanes, for example, therefore have to be added to these silicone resins in order to improve their adhesion.

The object of the present invention was therefore to provide coated particles, particularly particles having a content of inorganic materials, and particularly carrier particles for electrostatographic processes, wherein the particles have a magnetic core and a coating on the core which a) is non-sticky, so that free-flowing particles which are predominantly free from agglomerates are obtained, b) does not soften, even at elevated temperature, c) prevents permanent adhesion and adhesive bonding of colour-imparting toners, d) has a high resistance to abrasion, e) adheres well to the particles, and f) in the case of carrier particles for electrophotography has a good charging capacity, so that sufficient toner is taken up and can be released again.

The object of the present invention was also to provide a process for coating particles, particularly particles having a content of inorganic material, and particularly magnetic particles, which does not have the aforementioned disadvantages and which is characterised, for example, in that the deposition of the coating is effected in apparatuses which are as simple as possible by a simple process, and curing of the coating is effected at low temperatures.

Surprisingly, it has now been found that coated particles which do not have the aforementioned disadvantages are obtained, particularly coated particles containing inorganic material, if the coating is produced from monomeric polyfunctional organo-silanes and/or hydrolysis products thereof and/or reaction products thereof with organo-silanes containing hetero atoms and/or alkoxides.

The present invention therefore relates to particles (A) which are coated with a material (B), wherein particles (A) preferably contain inorganic material and are most preferably magnetic carrier particles for electrostatographic processes, and wherein material (B) is a monomeric, polyfunctional organosilane and/or a hydrolysis product thereof and/or a reaction product thereof with an organosilane containing a hetero atom and/or an alkoxide.

Organosilanes which contain hetero atoms in the sense of this invention consist of at least one silicon atom with hydrolysable and/or condensation crosslinking groups such as —SiOR, wherein R represents alkyl, cycloalkyl or aryl in particular, preferably alkyl, or consist of SiOH and at least one organic radical which contains a hetero atom and which is bonded via a carbon atom, which may be an alkyl, cycloalkyl or aryl radical. The hetero atoms of the organosilanes which contain hetero atoms are preferably N, P, S, F, Cl, Br, O, B and Al.

The preferred hetero atoms are N and F, wherein nitrogen atoms are particularly preferred.

The preferred organosilanes which contain nitrogen correspond to formula (I)

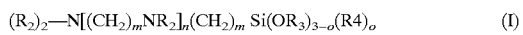

wherein m represents 1 to 10, preferably 2 or 3, n represents 0 to 2, preferably 2, o represents 0 to 2, preferably 0, $R_2$ represents H, alkyl or aryl, preferably H, and $R_3$, $R_4$ represent alkyl or aryl, preferably $CH_3$ or $C_2H_5$.

The preferred alkoxides correspond to formula (II)

$$M_1(OR_1)_y \quad (II),$$

wherein $M_1$ represents Si, Sn, Ti, Zr, B or Al, $R_1$ represents alkyl or aryl, preferably a $C_1$–$C_4$ alkyl, and y represents 4 in the case of Si, Sn, Ti and Zr, and represents 3 in the case of B or Al.

Polyfunctional organosilanes in the sense of the invention are characterised in that they contain at least 2, preferably at least 3 silicon atoms, each with 1 to 3 hydrolysable and/or condensation crosslinking groups, particularly alkoxy, acyloxy or hydroxy groups, and the silicon atoms are each bonded by a Si—C bond to a structural unit linked to the silicon atoms.

In the simplest case, examples of linked structural units which are suitable in the sense of the invention include linear or branched $C_1$ to $C_{10}$ alkylene chains, $C_5$ to $C_{10}$ cycloalkylene radicals, aromatic radicals, such as phenyl, naphthyl or biphenyl for example, and combinations of aromatic and aliphatic radicals also. The aliphatic and aromatic radicals may also contain hetero atoms, such as Si, N, O, S or F for example.

In addition, siloxanes in chain, ring or cage form, such as silsesquioxanes, are also suitable as linked structural units.

Examples of linking structural units are listed below, wherein X denotes Si atoms which have 1 to 3 hydrolysable and/or condensation crosslinking groups, and Y denotes corresponding Si atoms which are bonded via an alkylene chain to the linking structural unit; n represents a number from 1 to 10, and m represents a number from 1 to 6:

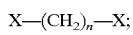

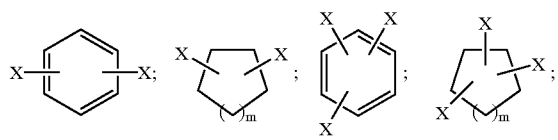

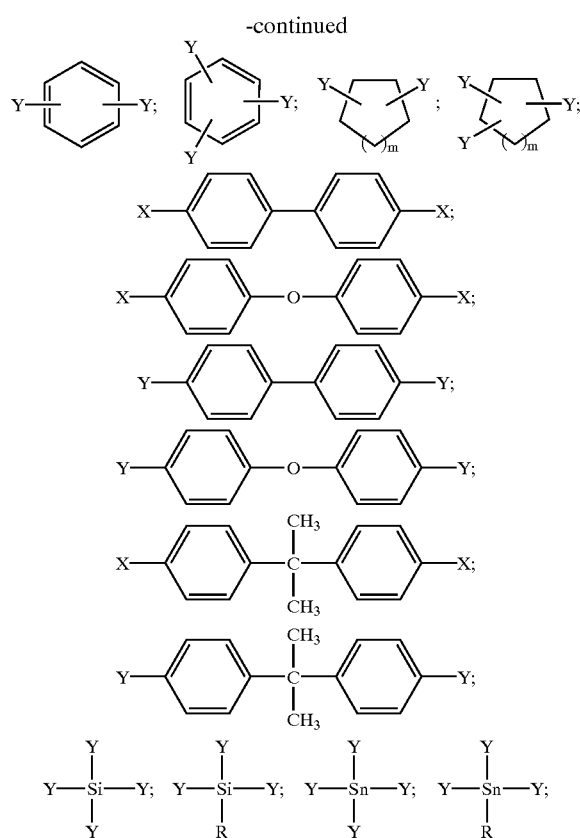

wherein R is an organic radical, e.g. alkyl, cycloalkyl, aryl or alkenyl.

Examples of polyfunctional organosilanes include compounds of general formulae (IV), (V) and (VI):

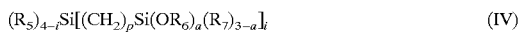

wherein i represents 2 to 4, preferably 4, p represents 1 to 4, preferably 2 to 4, $R_5$ represents alkyl or aryl, $R_6$ represents hydrogen, alkyl or aryl when a is 1 and alkyl or aryl when a is 2 or 3, $R_7$ represents alkyl or aryl, preferably methyl, and a represents 1 to 3;

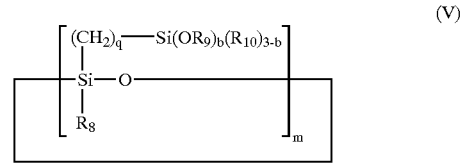

wherein m represents 3 to 6, preferably 3, q represents 2 to 10, preferably 2, b represents 1 to 3, $R_8$ represents a $C_1$–$C_6$ alkyl or a $C_6$–$C_{14}$ aryl, preferably methyl or ethyl, $R_9$ represents hydrogen, alkyl or aryl when b is 1, or alkyl or aryl when b is 2 or 3, and $R_{10}$ represents alkyl or aryl, preferably methyl;

wherein r represents 1 to 10, preferably 2 to 4, c represents 1 to 3, k represents 2 to 4, preferably 4, $R_{11}$ represents alkyl or aryl, preferably methyl, $R_{12}$ represents H, alkyl or aryl, preferably H, $CH_3$, $C_2H_5$ or $C_3H_7$, when c is 1; and alkyl or aryl, preferably $CH_3$, $C_2H_5$ or $C_3H_7$, when c is 2 or 3, $R_{13}$ represents alkyl or aryl, preferably methyl, and $R_{14}$ represents alkyl or aryl.

Examples of polyfunctional organosilanes include:

(a-1) $Si[(CH_2)_2Si(OH)(CH_3)_2]_4$, (a-2) $H_3C-Si[(CH_2)_2Si(OH)(CH_3)_2]_3$, (a-3) $C_6H_5-Si[(CH_2)_2Si(OH)(CH_3)_2]_3$, (a-4) $Si[(CH_2)_3Si(OH)(CH_3)_2]_4$, (a-5) cyclo-$\{OSiCH_3[(CH_2)_2Si(OH_3)(CH_3)_2]\}_4$, (a-6) cyclo-$\{OSiCH_3[(CH_2)_2Si(OCH_3)(CH_3)_2]\}_4$, (a-7) cyclo-$\{OSiCH_3[(CH_2)_2Si(OCH_3)_2CH_3]\}_4$, (a-8) cyclo-$\{OSiCH_3[(CH_2)_2Si(OC_2H_5)_2CH_3]\}_4$, (a-9) cyclo-$\{OSiCH_3[(CH_2)_2Si(OC_2H_5)_3]\}_4$.

Examples of alkoxysilanes which contain nitrogen include:

(b-1) $H_2N-(CH_2)_3Si(OCH_3)_3$ (b-2) $H_2N-(CH_2)_3Si(OC_2H_5)_3$ (b-3) $H_2N-(CH_2)_2-HN-(CH_2)_3Si(OCH_3)_3$ (b-4) $H_2N-(CH_2)_2-HN-(CH_2)_3Si(OCH_3)_2(CH_3)$ (b-5) $C_6H_5-HN-(CH_2)_3Si(OCH_3)_3$ (b-6) $C_6H_5-HN-(CH_2)_3Si(C_2H_5)_3$ (b-7) $H_2N-(CH_2)_2-HN-(CH_2)_2-HN-(CH_2)_3Si(OCH_3)_3$ (b-8) $H_2N-(CH_2)_2-HN-(CH_2)_2-HN-(CH_2)_3Si(OC_2H_5)_3$.

Examples of alkoxysilanes which contain fluorine include:

(d-1) $F_3C-(CH_2)_2-SiR'_{3-x}(OR)_x$ (d-2) $F_3C-(CF_2)_7-(CH_2)_2-SiR'_{3-x}(OR)_x$ (d-3) $(F_3C)_2CF-O-(CH_2)_3-SiR'_{3-x}(OR)_x$ (d-4) $(3-F_3C-C_6H_4)-SiR'_{3-x}(OR)_x$ (d-5) $(3-F_3C-C_6H_4)_2Si(OR)_2$.

wherein x is 1 to 3 and R and R' are alkyl, cycloalkyl or aryl, preferably ethyl or methyl.

Examples of alkoxides which can be used for the production of the reaction products according to the invention, e.g. in order to obtain an improvement in abrasion-resistance or in the tribological properties, include:

(c-1) $Si(OC_2H_5)_4$ (c-2) $B(OC_2H_5)_3$ (c-3) $Al(O-i-C_3H_7)_3$ (c-4) $Zr(O-i-C_3H_7)_4$.

In addition, the reaction products according to the invention can also contain finely divided metal oxides or metal oxide-hydroxides of the elements Si, Sn, In, Tl, Zr, B or Al, e.g. silica sols, which contain organic solvents in particular. The preferred primary particle size thereof falls within the range from 1 to 50 nm; they are hereinafter termed "nanoparticles". Agents which induce conductivity, e.g. carbon and charge-regulating agents e.g. nigrosine, can also be added to the coating.

Material B preferably contains 0.1 to 100% by weight of polyfunctional organosilane, 0 to 20% by weight of organosilane (I) which contains a hetero atom, 0 to 70% by weight of nanoparticles and 0 to 99.9% by weight of alkoxide (II). Material B most preferably contains 20 to 80% by weight of polyfunctional organosilane, 20 to 80% by weight of alkoxide (II), 0 to 10% by weight of organosilane (I) which contains a hetero atom, and 0 to 50% by weight of nanoparticles.

Magnetic inorganic particles are preferred as the particles.

The magnetic particles are preferably iron oxide pigments of formula (III)

wherein

M is Li, Mg, Sr, Ba, Mn, Fe(II), Co, Ni, Cu, Zn or Cd, and the molar ratio of x to z is between 0 and 1, preferably between 0.3 and 1.

It is also possible to use composite particles which consist of 20 to 85% by weight of magnetic microparticles and an organic or inorganic binder, e.g. an organic polymer or a ceramic material. Moreover, it is possible to use non-magnetic cores such as glass beads.

Reaction products B) according to the invention are generally deposited on particles A) as a coating. The polyfunctional organosilanes can be deposited on particles A in solvent-free form or dissolved in a solvent, optionally in the presence of a catalyst. Coating B) is obtained after volatilisation of the solvent and curing at a suitable temperature.

In one preferred embodiment, the polyfunctional organosilanes are first mixed, optionally in a solvent, with alkoxides and with organosilanes containing hetero atoms, for example, and are deposited on particles A, optionally in the presence of a catalyst, and cured. In order to increase the reactivity and to reduce the drag-out of low-boiling, readily volatile starting materials such as tetraethyl orthosilicate, it is particularly advantageous firstly to react the starting materials with water, optionally in the presence of a catalyst. Reactive, less volatile, oligomers and/or polymers are formed in the course of this procedure.

After a defined reaction time, this coating solution is deposited by a suitable method, e.g. in a fluidised bed, on the materials which contain iron oxide, the volatile constituents are volatilised and the coating which is thus obtained is optionally subsequently cured thermally.

Suitable catalysts include organic and inorganic acids or bases, e.g. $HCO_2H$, $CH_3COOH$, HCl, $NH_4OH$ and alkali metal hydroxides, as well as salts containing F such as NaF or $NH_4F$. The added metal oxides themselves, such as $Ti(OC_2H_5)_4$ and $Ti(Oi-C_3H_7)_4$, may also have a catalytic effect. Metal soaps such as zinc octoate or dibutyltin laurate may also be used.

Information on the hydrolysis and condensation of polyfunctional organosilanes, optionally in the presence of alkoxides, is to be found, for example, in DE-OS 196 03 242 and in WO 94/06897. For example, the polyfunctional organosilanes are mixed with the alkoxides, a solvent, water and a catalyst with stirring and are allowed to react for a defined period before films or, after complete reaction (gelling), even shaped bodies can be obtained from these solutions. The film-forming properties of reaction product (B) constitute a useable indication that the solutions are suitable for coating the particles. If a glass plate is coated, for example, a transparent, substantially fissure-free film which wets the entire area should be obtained after volatilisation of the volatile constituents. The tendency to form fissures increases with the layer thickness of the film, however.

In one preferred embodiment of the process according to the invention, the alkoxysilanes which contain nitrogen are not added until the polyfunctional organosilanes and optionally the alkoxides have been reacted as described above and this preliminary condensate has been diluted with further solvent. As is known from the literature, silanes which contain nitrogen, such as $H_2N$—$(CH_2)_3Si(OMe)_3$, catalyse the hydrolysis and condensation of alkoxysilanes. This can result in the most reactive component, e.g. $H_2N$—$(CH_2)_3Si(OCH_3)_3$, being rapidly hydrolysed and being condensed to form an insoluble solid. This can be prevented by adding the alkoxysilanes which contain nitrogen to the diluted coating solution.

In order to obtain a homogeneous distribution of the coating solution on all the particles which contain iron oxide, it is advantageous to dilute the preliminary condensate further with additional solvent. Moreover, the further reaction of the polyfunctional organosilanes and alkoxides which are used proceeds considerably more slowly in dilute solutions, which results in improved stability of the coating solutions on storage.

Examples of suitable solvents which can be used for the dilution of the preliminary condensate include alcohols such as methanol, ethanol, n-propanol, n-butanol, iso-propanol, sec-butanol or ethylene glycol, ketones such as acetone or methyl ethyl ketone, amides such as N-methylpyrrolidone, or even water. Alcohols, particularly iso-propanol, are preferred, due to their good miscibility with the preliminary condensate. Mixtures of different solvents may also be used.

After the deposition of the coating solution, the solvents can be recovered, e.g. by condensation, and can be re-used in the process, optionally after purification.

Curing of the coating is preferably effected at temperatures from 25 to 220° C., more preferably from 80 to 180° C., most preferably from 100 to 140° C.

The amount of coating deposited with respect to the core is between 0.1 and 10% by weight, preferably between 0.5 and 5% by weight, and most preferably between 0.5 and 2% by weight.

In particular, the coated inorganic particles, particularly carrier particles for electro-photography which contain a magnetic core, are spherical and have an average particle diameter of 20 to 200 μm, preferably 40 to 120 μm.

It is also possible to deposit two or more layers on the particles (A), e.g. firstly an electrically insulating layer and above this a layer which improves the stability of the coated particles under mechanical stress.

EXAMPLES

Preliminary Remarks

Cu—Zn ferrite particles supplied by Powdertech Co. Ltd., 217 Toyofuta, Kashiwa-Shi, Chiba (Japan) were used as particles containing iron oxide for coating tests. These were characterised as follows:

$d_{50}$: 50 μm density: 2.68 g/cm$^3$ saturation magnetisation: 60–70 emu/g resistance: 2·10$^7$ ohm .cm Their flowability was determined using a run-out cup and 500 g of the coated particles.

The specific resistance ($\Omega_{spec}$) of the carrier was determined in a cylindrical measuring cell with an inside diameter of 22.5 mm. This was filled to a height of 4 mm with carrier, on which a die was placed which was loaded with 1 kg. The current strength at a voltage of 200 V was read from the measuring device and $\Omega_{spec}$ was calculated as follows:

$$\Omega_{spec}=(U/I)\times(S/d)[\Omega cm]$$

where

U=the applied voltage (200 V)

I=the measured current strength

S=the internal surface of the measuring cell (4 cm$^2$)

d=the height of the carrier introduced (0.4 cm).

The charge acceptance (−Q/m) was determined by development. For this purpose, 100 parts by weight of carrier and 5 parts by weight of toner were mixed in the developer unit. The developer mixture was activated for 10 minutes in a commercial copier device. After development, both the amount of toner generated (m) and the charge thereof (Q) were measured.

The charge acceptance was therefore given by:

$$-Q/m=\frac{Q(\text{in }10^{-6}\text{ C})}{m(\text{in g})}[\mu C/g]$$

The amount of coating given in the examples is represented by the sum of the amounts of polyfunctional organosilane and of tetraethyl orthosilicate used, in % by weight, in relation to the amount of carrier. The proportion of nitrogen-containing aminosilane (b-1) or (b-8) is given in % by weight in relation to the coating material.

To determine the abrasion-resistance of the coating, 80 g of the coated carrier was mixed with 50 g of ceramic beads with a diameter of 10 mm in a 120 ml bottle, so that the degree of filling of the bottle was about 50%. The bottle was rotated for 16 hours on a roller table at a speed of 25 m/minute. The coating was partially abraded by this process and the amount of coating material removed by abrasion was determined as follows:

The amount removed by abrasion was so small that it could not be determined gravimetrically. However, it could be distributed very homogeneously on a sheet of paper with a known optical density (determined using a Macbeth densitometer). The optical density was then re-measured. The values given in the Tables are density differences which could be reproduced very well. The smaller the value, the less the abrasion.

The particles could be coated by different methods, e.g. in an industrial fluid bed reactor or in a 2 litre three-necked flask fitted with a stirrer, with an injection system for solution containing the coating material and with a condenser for recovering volatilised solvent.

A coating temperature of 80 to 100° C. under a slightly reduced pressure of 950 to 100 mbar absolute, using a coating period of 15 to 60 minutes, proved to be advantageous. Curing was effected in the same vessel at 120 to 190° C. for 20 minutes to 4 hours. "X" in Tables 1 to 3 means that the substance was not used.

TABLE 1

| Solution No. | (a-1) | (c-1) | Water | Formic acid | (b-1) | (b-7) |
|---|---|---|---|---|---|---|
| 1 | 75.0 g | x | 3.0 g | 22.5 g | x | x |
| 2 | 75.0 g | x | 3.0 g | 22.5 g | x | 1.50 g |
| 3 | 12.4 g | 25.1 g | 1.5 g | 11.3 g | x | 1.01 g |
| 4 | 12.4 g | 25.1 g | 1.5 g | 11.3 g | x | 1.50 g |

TABLE 1-continued

| Solution No. | (a-1) | (c-1) | Water | Formic acid | (b-1) | (b-7) |
|---|---|---|---|---|---|---|
| 5 | 24.8 g | 50.2 g | 3.0 g | 22.5 g | x | 1.05 g |
| 6 | 24.8 g | 50.2 g | 3.0 g | 22.5 g | x | 2.03 g |
| 7 | 24.8 g | 50.2 g | 3.0 g | 22.5 g | x | 3.00 g |
| 8 | 37.2 g | 75.3 g | 4.5 g | 33.8 g | x | 1.58 g |
| 9 | 37.2 g | 75.3 g | 4.5 g | 33.8 g | x | 3.00 g |
| 10 | 37.2 g | 75.3 g | 4.5 g | 33.8 g | x | 4.50 g |
| 11 | 49.6 g | 100.4 g | 6.0 g | 45.0 g | x | 2.10 g |
| 12 | 49.6 g | 100.4 g | 6.0 g | 45.0 g | x | 4.05 g |
| 13 | 49.6 g | 100.4 g | 6.0 g | 45.0 g | x | 6.00 g |
| 14 | 1.65 g | 3.3 g | 0.2 g | 1.5 g | 0.20 g | x |
| 15 | 3.30 g | 6.7 g | 0.4 g | 3.0 g | 0.20 g | x |
| 16 | 3.30 g | 6.7 g | 0.4 g | 3.0 g | 0.40 g | x |
| 17 | 3.30 g | 6.7 g | 0.4 g | 3.0 g | 0.60 g | x |
| 18 | 3.30 g | 6.7 g | 0.4 g | 3.0 g | 0.80 g | x |
| 19 | 6.60 g | 13.4 g | 0.8 g | 6.0 g | 0.40 g | x |
| 20 | 6.60 g | 13.4 g | 0.8 g | 6.0 g | 0.80 g | x |
| 21 | 6.60 g | 13.4 g | 0.8 g | 6.0 g | 1.60 g | x |
| 22 | 6.60 g | 13.4 g | 0.8 g | 6.0 g | x | x |
| 23 | 6.60 g | 13.4 g | 0.8 g | 6.0 g | 0.10 g | x |
| 24 | 6.60 g | 13.4 g | 0.8 g | 6.0 g | 0.40 g | x |
| 25 | 6.60 g | 13.4 g | 0.8 g | 6.0 g | 0.80 g | x |
| 26 | 13.2 g | 26.8 g | 1.6 g | 12.0 g | 0.20 g | x |
| 27 | 13.2 g | 26.8 g | 1.6 g | 12.0 g | 1.60 g | x |
| 28 | 3.3 g | 6.7 g | 0.4 g | 3.0 g | x | 0.14 g |
| 29 | 4.9 g | 10.1 g | 1.0 g | 2.5 g | x | x |

TABLE 2

| Solution No. | (a-5) | (a-6) | (a-8) | (c-1) | Water | Formic acid | HCl | (b-7) |
|---|---|---|---|---|---|---|---|---|
| 30 | 68.2 g | x | x | 87.8 g | 23.2 g | 18.0 g | x | 1.50 g |
| 31 | x | 48.0 g | x | 72.0 g | x | x | 14.2 g | 1.12 g |
| 32 | x | x | 39.7 g | 37.5 g | 16.0 g | 8.0 g | x | 1.50 g |

TABLE 3

| Solution No. | (a-1) | (c-1) | Water | Formic acid | Bontron N-O2 | Spilon black TRH | Carbon black |
|---|---|---|---|---|---|---|---|
| 33 | 24.8 g | 50.2 g | 5.25 g | 12.5 g | 1.5 g | x | x |
| 34 | 24.8 g | 50.2 g | 5.25 g | 12.5 g | x | 1.5 g | x |
| 35 | 24.8 g | 50.2 g | 5.25 g | 12.5 g | x | x | 10.0 g |

Bontron N—O 2 is a nigrosine compound which is employed for charge control. Spilon black TRH is a Cr-azo complex which is employed for charge control. Carbon black is a conductive lamp black.

Coating Example 1

75 kg of the ferrite particles were coated with solutions 1 and 2 at 85° C. and 98° mbar, dried, and cured by heating for 3 hours at 140° C. The results are given in Table 4.

TABLE 4

| Sample No. | Solution No. | Amount of coating [% by weight] | Content of (b-7) [% by weight] | $\Omega_{spec}$ [Ω cm] | $-Q/m$ [μC/g] | Abrasion |
|---|---|---|---|---|---|---|
| 1.1 | 1 | 1 | 0 | $3.0 \times 10^9$ | 11.0 | 0.19 |
| 1.2 | 2 | 1 | 2 | $1.3 \times 10^9$ | 13.9 | 0.02 |

Comparison Example 1

A solution of 3.6 g of a silicone resin containing 95% by weight T units and 5% by weight M units (linkage of the Si atom via an oxygen atom with a further Si atom), 2.1 g of a silicone resin containing 100% by weight T units, 300 ml methyl ethyl ketone and 0.84 g (b-1) were mixed in this sequence, with stirring. A ready-for-processing coating solution was obtained, which gave a 0.5% by weight coating on 1 kg ferrite particles.

Coating was effected at 70° C. and 50 mbar. The product was dried for 30 minutes at 90° C. and was cured for 16 hours at 140° C. The results are presented in Table 5.

TABLE 5

| Sample No. | Amount of coating [% by weight] | Content of (b-7) [% by weight] | $\Omega_{spec}$ [$\Omega$ cm] | $-Q/m$ [$\mu C/g$] |
|---|---|---|---|---|
| Comparison 1 | 0.6 | 14.7 | $3.5 \times 10^9$ | 2.6 |

The particles were sticky and therefore formed an amount of agglomerates or bonded firmly to the vessel. A larger amount of dust was formed on drying.

Coating Example 2

7.5 kg of the ferrite particles were coated with solutions 3 to 13 at 95° C. and 980 mbar, dried for 30 minutes at 90° C. and cured for 4 hours at 140° C. The results are listed in Table 6.

TABLE 6

| Sample No. | Solution No. | Amount of coating [% by weight] | Content of (b-7) [% by weight] | $\Omega_{spec}$ [$\Omega$ cm] | $-Q/m$ [$\mu C/g$] |
|---|---|---|---|---|---|
| 2.1 | 3 | 0.5 | 2.7 | $1.0 \times 10^9$ | 9.9 |
| 2.2 | 4 | 0.5 | 4.0 | $5.0 \times 10^8$ | 12.7 |
| 2.3 | 5 | 1.0 | 1.4 | $1.1 \times 10^9$ | 6.4 |
| 2.4 | 6 | 1.0 | 2.7 | $1.3 \times 10^9$ | 9.3 |
| 2.5 | 7 | 1.0 | 4.0 | $1.7 \times 10^{10}$ | 16.5 |
| 2.6 | 8 | 1.5 | 1.4 | $5.0 \times 10^9$ | 7.4 |
| 2.7 | 9 | 1.5 | 2.7 | $4.3 \times 10^{10}$ | 13.3 |
| 2.8 | 10 | 1.5 | 4.0 | $3.1 \times 10^{11}$ | 14.2 |
| 2.9 | 11 | 2.0 | 1.4 | $6.1 \times 10^{10}$ | 11.9 |
| 2.10 | 12 | 2.0 | 2.7 | $1.5 \times 10^{12}$ | 12.6 |
| 2.11 | 13 | 2.0 | 4.0 | $3.3 \times 10^{13}$ | 29.0 |

Coating Example 3

1 kg of the ferrite particles were coated with solutions 14 to 21 at 70° C. and 200 mbar, dried for 30 minutes at 90° C. and 50 mbar, and cured for 4 hours at 140° C. The results are listed in Table 7.

TABLE 7

| Sample No. | Solution No. | Amount of coating [% by weight] | Content of (b-7) [% by weight] | $\Omega_{spec}$ [$\Omega$ cm] | $-Q/m$ [$\mu C/g$] |
|---|---|---|---|---|---|
| 3.1 | 14 | 0.5 | 4.0 | $8.0 \times 10^8$ | 9.5 |
| 3.2 | 15 | 1.0 | 2.0 | $1.3 \times 10^9$ | 9.5 |
| 3.3 | 16 | 1.0 | 4.0 | $1.0 \times 10^{10}$ | 12.1 |
| 3.4 | 17 | 1.0 | 6.0 | $1.0 \times 10^{11}$ | 14.3 |
| 3.5 | 18 | 1.0 | 8.0 | $1.0 \times 10^{12}$ | 19.4 |
| 3.6 | 19 | 2.0 | 2.0 | $9.5 \times 10^{10}$ | 10.8 |
| 3.7 | 20 | 2.0 | 4.0 | $4.0 \times 10^{13}$ | 21.6 |
| 3.8 | 21 | 2.0 | 8.0 | $6.5 \times 10^{13}$ | 21.0 |

Coating Example 4

Coatings were deposited on 2 kg of the ferrite particles with solutions 22 to 27 in a fluidised bed reactor, under the following conditions:

Bed temperature: 100° C.

Gas temperature: 135° C.

Spraying rate: 90 kg/hour

Spraying direction: from below

Duration of spraying: 40 minutes.

Thereafter, the product was subsequently cured for about 90 minutes at a bed temperature of 150° C. and was finally cooled to room temperature.

The results are listed in Table 8.

TABLE 8

| Sample No. | Solution No. | Amount of coating [% by weight] | Content of (b-7) [% by weight] | $\Omega_{spec}$ [$\Omega$ cm] | $-Q/m$ [$\mu$C/g] |
| --- | --- | --- | --- | --- | --- |
| 4.1 | 22 | 1.0 | 0 | $5 \times 10^8$ | 2.7 |
| 4.2 | 23 | 1.0 | 0.5 | $2.8 \times 10^8$ | 6.0 |
| 4.3 | 24 | 1.0 | 2.0 | $3.0 \times 10^8$ | 5.7 |
| 4.4 | 25 | 1.0 | 4.0 | $4.9 \times 10^8$ | 6.5 |
| 4.5 | 26 | 2.0 | 0.5 | $3.5 \times 10^{12}$ | 2.6 |
| 4.6 | 27 | 2.0 | 4.0 | $4.9 \times 10^{11}$ | 5.9 |

Coating Example 5

7.5 kg of the ferrite particles were coated with solution 5 as in coating example 1 and were cured under different conditions. The results are given in Table 9.

TABLE 9

| Sample No. | Curing temperature and time [° C., min] | Amount of coating [% by weight] | Content of (b-7) [% by weight] | $\Omega_{spec}$ [$\Omega$ cm] | $-Q/m$ [$\mu$C/g] |
| --- | --- | --- | --- | --- | --- |
| 5.1 | 140, 30 | 1.0 | 1.4 | $1.0 \times 10^8$ | 16.0 |
| 5.2 | 140, 120 | 1.0 | 1.4 | $1.0 \times 10^8$ | 14.6 |
| 5.3 | 170, 30 | 1.0 | 1.4 | $1.0 \times 10^8$ | 17.1 |
| 5.4 | 170, 120 | 1.0 | 1.4 | $1.0 \times 10^8$ | 16.2 |

Coating Example 6

1 kg of magnetic carrier CM 40–75 SH supplied by Hoganas AB, S 26383 Hoganas (Sweden), with an average particle diameter of 65 $\mu$m and a saturation magnetisation of 90 emu/g, was coated with solution 28, with an amount of coating of 1.0% by weight and a content of b-1 of 4.0% by weight.

$\Omega_{spec}$ was $4 \times 10^5 \Omega$cm; $-Q/m$ was 9.3 $\mu$C/g.

Coating Example 7

3.5 kg of glass beads with an average diameter of 360 $\mu$m were coated with solution 29. The amount of coating was 0.4% by weight. A coating which adhered well was obtained. After the admixture of toner, the coated glass beads were suitable as electrophotographic cascade developers.

Coating Example 8

7.5 kg of ferrite carrier was coated with solution 30 at 85° C. and 980 mbar, as in example 6, dried, and cured for 2 hours at 160° C. The amount of coating was 2.1% by weight; the content of b-7 was 1.0% by weight.

$\Omega_{spec}$ was $2.2 \times 10^9$ $\Omega$cm; $-Q/m$ was 16.1 $\mu$C/g; abrasion: 0.12; coarse fraction >125$\mu$m 0.9% by weight.

Coating Example 9

7.5 kg of ferrite carrier was coated with solution 31 at 85° C. and 980 mbar, as in example 6, dried, and cured for 4 hours at 160° C. The amount of coating was 1.6% by weight; the content of b-7 was 0.9% by weight.

$\Omega_{spec}$ was $1.5 \times 10^8$; $-Q/m$ was 18.7 $\mu$C/g; abrasion: 0.14; coarse fraction >125$\mu$m 0.1% by weight.

Coating Example 10

7.5 kg of ferrite carrier was coated with solution 32 at 85° C. and 980 mbar, as in example 6, dried, and cured for 2 hours at 140° C. The amount of coating was 1.0% by weight; the content of b-7 was 2.0% by weight.

$\Omega_{spec}$ was $1.5 \times 10^8$; $-Q/m$ was 18 $\mu$C/g; abrasion: 0.12; coarse fraction >125$\mu$m 0.1% by weight.

Coating Example 11

7.5 kg of ferrite carrier was coated with solution 33 to 35 at 85° C. and 980 mbar, as in example 6, dried, and cured for 2 hours at 140° C. The results are presented in Table 10:

TABLE 10

| Sample No. | Solution No. | Amount of coating [% by weight] | $\Omega_{spec}$ [$\Omega$ cm] | $-Q/m$ [$\mu$C/g] | Abrasion | Coarse fraction >125 $\mu$m [% by weight] |
| --- | --- | --- | --- | --- | --- | --- |
| 11.1 | 33 | 1.0 | $2.9 \times 10^8$ | 4.0 | 0.10 | 0.04 |
| 11.2 | 34 | 1.0 | $1.5 \times 10^8$ | 8.9 | 0.09 | 0.09 |
| 11.3 | 35 | 1.0 | $9.0 \times 10^7$ | 8.8 | 0.13 | 0.07 |

Example 12

Developers were prepared with the carriers produced as in coating examples 2, samples 2.3 and 9, and were tested, by the admixture of toner, in a continuous 10 printing test on a digital colour printer (Chromapress® manufactured by Agfa-Gevaert AG). More than 400,000 copies in DIN A4 format were produced, and were of a constant, good quality.

What is claimed is:

1. Coated particles comprising particles (A) coated with a material (B), wherein material (B) is a monomeric, polyfunctional organosilane containing at least two silicon atoms, each with one to three hydrolysable and/or condensation cross-linking groups, and the silicon atoms are each bonded by an Si—C bond to a structural unit which links the silicon atoms, and/or a hydrolysis product of said monomeric, polyfunctional organosilane and/or a reaction product of said monomeric, polyfunctional organosilane, with an organosilane containing a hetero atom and/or an alkoxide.

2. The coated particles according to claim 1, wherein the particles (A) contain inorganic material.

3. The coated particles according to claim 1, wherein the particles (A) are inorganic particles.

4. The coated particles according to claim 1, wherein the particles (A) are magnetic carrier particles for electrostatographic processes.

5. The coated particles according to claim 1, wherein the organosilane which contains a hetero atom is an organosilane which contains nitrogen or an organosilane which contains fluorine.

6. The coated particles according to claim 5, wherein the alkoxysilane contains nitrogen and corresponds to the formula (I)

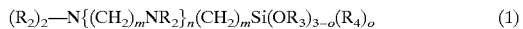

(R$_2$)$_2$—N{(CH$_2$)$_m$NR$_2$}$_n$(CH$_2$)$_m$Si(OR$_3$)$_{3-o}$(R$_4$)$_o$     (1)

wherein m represents 1 to 10, n represents 0 to 2, o represents 0 to 2,

R$_2$ represents H, alkyl or aryl, and

R$_3$ and R$_4$ are identical or different and represent alkyl or aryl.

7. The coated particles according to claim 6, wherein m is 2 or 3, n is 2, o is 0, R$_2$ is H, R$_3$ and R$_4$ are identical or different and are CH$_3$ or C$_2$H$_5$.

8. The coated particles according to claim 7, wherein the magnetic carrier particles are magnetic iron oxide pigments of formula (III)

(MO)$_x$(Fe$_2$O$_3$)$_z$     (III)

wherein

M represents Li, Mg, Sr, Ba, Mn, Fe(II), Co, Ni, Cu, Zn or Cd, and the molar ratio of x to z is between 0 and 1.

9. The coated particles according to claim 1, wherein the alkoxide corresponds to formula (II)

M$_1$(OR$_1$)$_y$     (II), wherein

M$_1$ represents Si, Sn, Ti, Zr, B or Al,

R$_1$ represents alkyl or aryl, and y represents 4 in the case where M$_1$ is Si, Sn, Ti and Zr, and represents 3 in the case where M$_1$ is B or Al.

10. The coated particles according to claim 9, wherein R$_1$ is C$_1$–C$_4$ alkyl.

11. The coated inorganic particles according to claim 1, wherein the polyfunctional organosilanes are compounds of general formulae (IV), (V) and (VI):

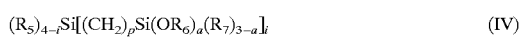

(R$_5$)$_{4-i}$Si[(CH$_2$)$_p$Si(OR$_6$)$_a$(R$_7$)$_{3-a}$]$_i$     (IV)

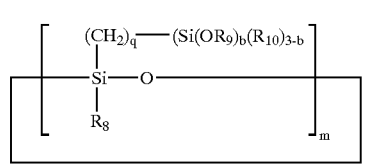

(V)

(R$_{14}$)$_{4-k}$Si[OSi(R$_{11}$)$_2$(CH$_2$)$_r$Si(OR$_{12}$)$_c$(R$_{13}$)$_{3-c}$]$_k$     (VI)

wherein i represents 2 to 4, p represents 1 to 4,

R$_5$ represents alkyl or aryl,

R$_6$ represents hydrogen, alkyl or aryl when a is 1 and alkyl or aryl when a is 2 or 3, R$_7$ represents alkyl or aryl, a represents 1 to 3;

m represents 3 to 6, q represents 2 to 10,

R$_8$ represents a C$_1$–C$_6$ alkyl or a C$_6$–C$_{14}$ aryl,

R$_9$ represents hydrogen, alkyl or aryl when b is 1, or alkyl or aryl when b is 2 or 3, R$_{10}$ represents alkyl or aryl, r represents 1 to 10, c represents 1 to 3, k represents 2 to 4, R$_{11}$ represents alkyl or aryl, R$_{12}$ represents H, alkyl or aryl when c is 1, and alkyl or aryl when c is 2 or 3, R$_{13}$ represents alkyl or aryl, and R$_{14}$ represents alkyl or aryl.

12. The coated particles according to claim 11, wherein i is 4, p is 2 to 4, R$_7$ is methyl, m is 3, q is 2, R$_8$ is methyl or ethyl, R$_{10}$ is methyl, r is 2 to 4, k is 4, R$_{11}$ is methyl, R$_{12}$ is H, CH$_3$, C$_2$H$_5$ or C$_3$H$_7$, when c is 1; and CH$_3$, C$_2$H$_5$ or C$_3$H$_7$, when c is 2 or 3, and R$_{13}$ is methyl.

13. The coated inorganic particles according to claim 1, wherein the particles are spherical, have an average particle diameter of 20 to 200 μm, and the amount of deposited coating is 0.1 to 10% by weight with respect to the inorganic core.

* * * * *

UNITED STATES PATENT AND TRADEMARK OFFICE
CERTIFICATE OF CORRECTION

PATENT NO. : 6,413,638 B1
DATED : July 2, 2002
INVENTOR(S) : Mager et al.

It is certified that error appears in the above-identified patent and that said Letters Patent is hereby corrected as shown below:

<u>Column 16,</u>
Line 40, delete "2to" and insert -- 2 to --.

Signed and Sealed this

Twenty-seventh Day of August, 2002

Attest:

Attesting Officer

JAMES E. ROGAN
Director of the United States Patent and Trademark Office